March 1, 1960  H. O. KOPLIN  2,926,951
VEHICLE SEAT
Filed Sept. 11, 1958  2 Sheets-Sheet 1
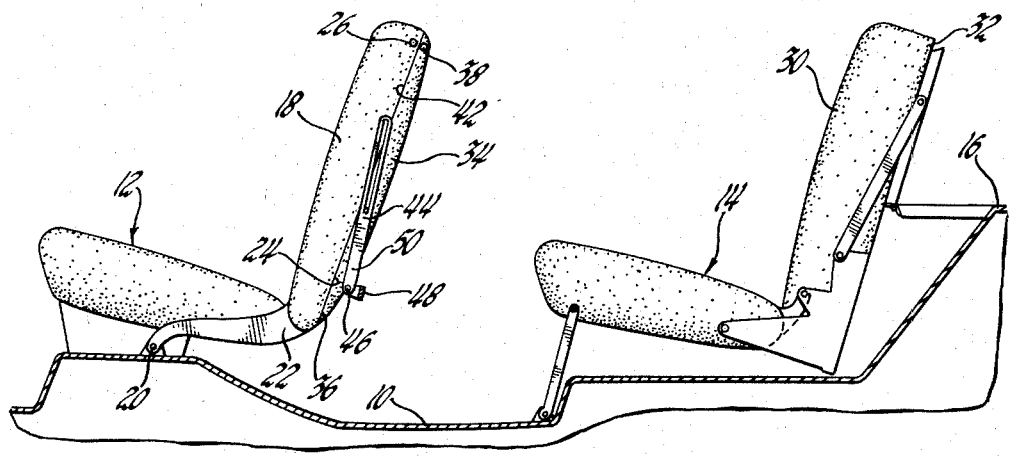
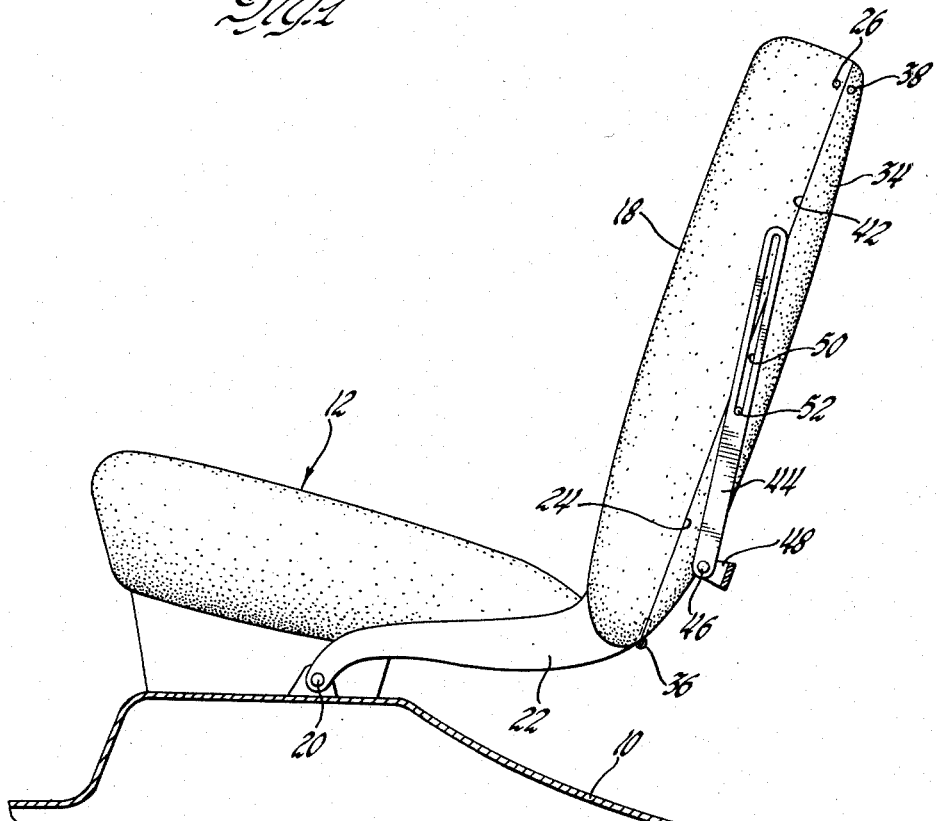
INVENTOR.
Hans O. Koplin
BY
ATTORNEY

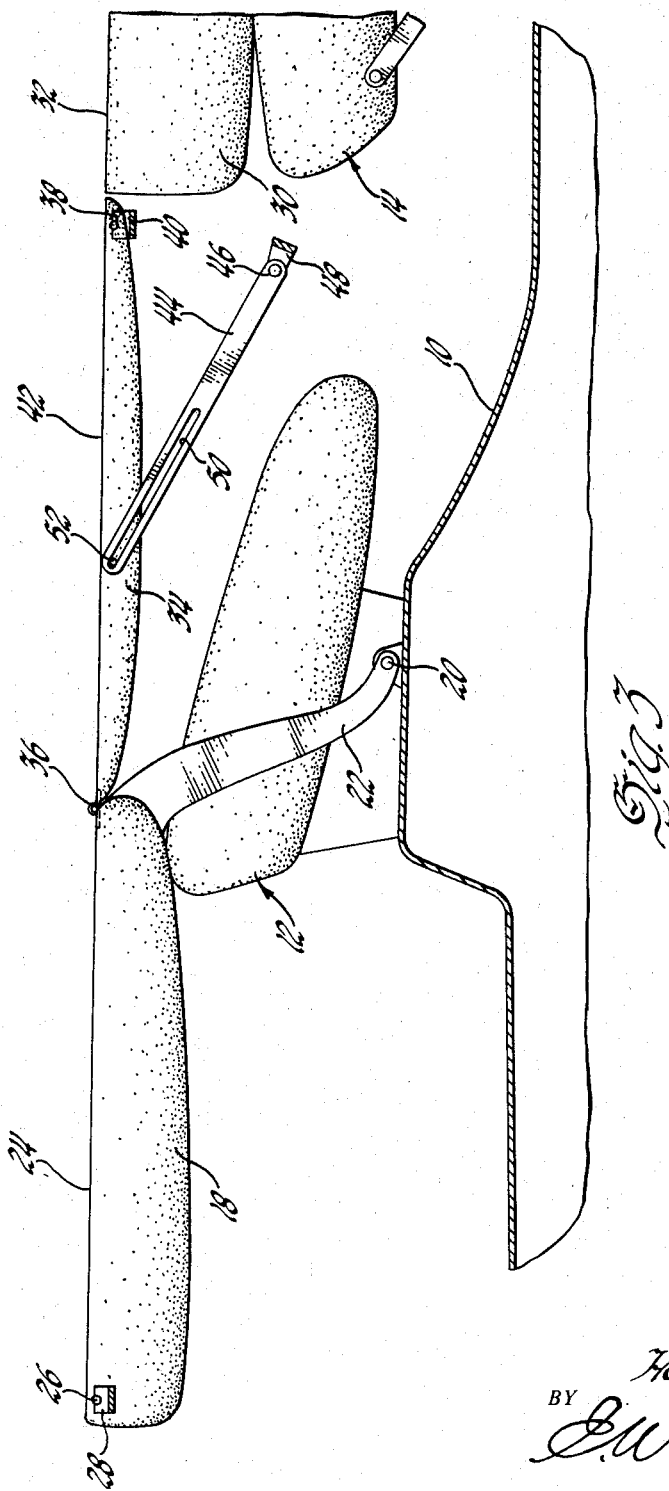

2,926,951
VEHICLE SEAT

Hans Otto Koplin, Warren, Mich., assignor to General Motors Corporation, Detroit, Mich., a corporation of Delaware Application September 11, 1958, Serial No. 760,438

4 Claims. (Cl. 296—66)

This invention relates to vehicle seats and more particularly to a foldable seat arrangement for stations wagons.

In the usual station wagon there is a second seat located behind the driver's seat and the second seat back is often hinge supported at its lower portion so as to be movable from an upright position where a seat is presented to a folded or horizontal position where a cargo carrying floor portion is presented above the primary floor of the vehicle body by the rear face of the second seat back. In some instances a third seat is located behind the second seat and it can likewise be folded to provide a cargo carrying floor portion above the primary floor. In other instances the elevated rear cargo carrying floor extends forward to the second seat back. In any event, forward folding of the second seat back from the upright position to the horizontal position will leave a gap in the overall cargo carrying floor surface; that is, there will be a space between the second and third seats or between the second seat and the rear cargo carrying floor.

An object of this invention is to provide a foldable seat back with a panel portion that is hinged thereto and that is movable from an upright position corresponding to the upright position of the seat back to a horizontal position when the seat back is folded so that the front face of the panel will serve as a continuation for the cargo carrying floor portion of the seat back, the panel being automatically moved to the horizontal position whenever the seat back is folded.

In the drawings:

Figure 1 is a partial sectional view of a station wagon body with second and third seats upright for passenger carrying purposes;

Figure 2 is an enlarged view of the second seat of Figure 1; and

Figure 3 is a partial sectional view of the station wagon body with the second and third seats folded for cargo carrying purposes.

Referring to the drawings, the station wagon body has a primary floor 10 which supports second and third seats 12 and 14 forward of the elevated rear floor 16. Only the left side is shown as the right side is similar. The second seat back 18 is hinged to the primary floor 10 at 20 by brackets 22 which connect to the lower portion of the seat back. The seat back 18 can thus be folded from the upright position of Figures 1 and 2 to the horizontal position of Figure 3 so that a cargo carrying floor portion is presented above the primary floor 10 by the rear face 24 of the seat back. A pin 26 at the rear upper edge of the seat back 18 engages a body bracket 28 in the folded position to provide a stable floor portion. The third seat back 30 is also hinged and can be folded from the upright position of Figure 1 to the horizontal position of Figure 3 so that another floor portion is presented above the primary floor by the rear face 32 of the seat back.

On viewing Figure 3 it is seen that the seat backs 18 and 30 are spaced from each other so that an auxiliary floor panel 34 is needed between them in order that a level cargo carrying floor may be had from the driver's seat to the tailgate. The panel 34 is hinged at one end to the lower portion of the seat back 18 at 36. The panel 34 has a pin 38 at its other end which engages a body bracket 40 to support the panel when it is moved from the upright position of Figure 2 to the horizontal position of Figure 3. The front face 42 of the panel 34 thus provides a stable floor portion that serves as a continuation between the floor portions of the seat backs 18 and 30.

A link 44 is pivoted at 46 to a body bracket 48 and has an elongated slot 50 which receives a pin 52 secured to the midportion of the panel 34. The slidable pivot connection between the panel 34 and link 44 provides a mechanical reaction to automatically move the panel to the horizontal position whenever the seat back 18 is moved to the horizontal position. When the seat back 18 is swung forward about the pivot 20 from the upright position of Figure 2 to the folded position of Figure 3, the pin 52 rides upward in the slot 50 until it reaches the end of the slot whereupon the lever 44 pulls against the pin and causes the panel 34 to swing on the pivot 36 and away from the seat back. While a slotted link is shown as providing a reaction means between the panel and body, it should be realized that other means can be used, for example, the pin 52 can ride a suitably shaped cam track which is rigidly secured to the body to afford the desired automatic movement.

While the embodiment of the invention here described is preferred, it is understood that modifications may be made by the exercise of skill in the art which will lie within the scope of the invention.

I claim:

1. In a vehicle body of the type having a seat bottom and a seat back that is hinge supported at its lower portion so as to be movable from an upright position where a passenger carrying seat is presented to a horizontal position where a cargo carrying floor portion is presented above the primary floor of the body by the rear face of the seat back, the improvement comprising a panel having one end hinged to the lower portion of the seat back and movable from an upright position corresponding to the upright position of the seat back to a horizontal position where a second cargo carrying floor portion is presented above the primary floor of the body by the front face of the panel to serve as a continuation for the cargo carrying floor portion of the seat back, mechanical reaction means connected to the panel to automatically move the panel to the horizontal position when the seat back is moved to the horizontal position, and bracket means fixed to the body and automatically engaged by the other end of the panel when the panel is moved to the horizontal position to afford support therefor.

2. Apparatus in accordance with claim 1 wherein the reaction means includes a linkage connection between the body and panel.

3. Apparatus in accordance with claim 1 wherein the reaction means comprises a lost motion linkage interconnecting the body and panel.

4. Apparatus in accordance with claim 1 wherein the reaction means comprises a link pivoted to the body and having a slot therein and a pin secured to the panel and slidably received in the slot of the link.

References Cited in the file of this patent

FOREIGN PATENTS

| 694,578 | Germany | Aug. 3, 1940 |
| 928,506 | Germany | June 2, 1955 |